US011064564B2

(12) United States Patent
Ghosh et al.

(10) Patent No.: US 11,064,564 B2
(45) Date of Patent: Jul. 13, 2021

(54) SOUNDING SEQUENCE NULL DATA PACKET ANNOUNCEMENT INDICATION

(71) Applicant: Intel Corporation, Santa Clara, CA (US)

(72) Inventors: Chittabrata Ghosh, Fremont, CA (US); Feng Jiang, Santa Clara, CA (US); Qinghua Li, San Ramon, CA (US); Ganesh Venkatesan, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/349,909

(22) PCT Filed: Jun. 28, 2017

(86) PCT No.: PCT/US2017/039689
§ 371 (c)(1),
(2) Date: May 14, 2019

(87) PCT Pub. No.: WO2018/111343
PCT Pub. Date: Jun. 21, 2018

(65) Prior Publication Data
US 2020/0068655 A1 Feb. 27, 2020

Related U.S. Application Data

(60) Provisional application No. 62/434,925, filed on Dec. 15, 2016.

(51) Int. Cl.
H04W 84/12 (2009.01)
H04L 5/00 (2006.01)
H04W 72/04 (2009.01)

(52) U.S. Cl.
CPC .......... *H04W 84/12* (2013.01); *H04L 5/0007* (2013.01); *H04L 5/0053* (2013.01); *H04L 5/0094* (2013.01); *H04W 72/0446* (2013.01)

(58) Field of Classification Search
CPC ..................................................... H04W 84/12
See application file for complete search history.

(56) References Cited

U.S. PATENT DOCUMENTS 8,989,332 B2 * 3/2015 Katumba ................ H03L 7/093
327/147
2015/0311968 A1 10/2015 Seok
(Continued)

FOREIGN PATENT DOCUMENTS

WO WO-2016021838 A1 2/2016

OTHER PUBLICATIONS i "International Application Serial No. PCT/US2017/039689, International Search Report dated Oct. 30, 2017", 3 pgs.
(Continued)

Primary Examiner — Kevin M Cunningham
(74) Attorney, Agent, or Firm — Schwegman Lundberg & Woessner, P.A.

(57) ABSTRACT

An apparatus of a wireless communications device to transmit a sounding announcement frame (SAF) for use in a round-trip estimation to a receiving station, and associated method are provided. The apparatus is configured to encode an encoded field of the SAF that is one of a frame control field (FCF) or a sounding dialog token field (SDTF) of a null data packet announcement (NDPA) packet that forms the SAF to indicate to the receiving station that a communication different from a trigger frame may follow. The apparatus is also configured to configure the wireless device to transmit the NDPA packet to one or more stations.

8 Claims, 11 Drawing Sheets

(56) References Cited

U.S. PATENT DOCUMENTS

| | | | | |
|---|---|---|---|---|
| 2015/0372795 A1* | 12/2015 | Wu | ............... | H04L 5/0057 |
| | | | | 370/329 |
| 2016/0143026 A1* | 5/2016 | Seok | ............... | H04W 72/046 |
| | | | | 370/329 |
| 2016/0149621 A1 | 5/2016 | Trainin | | |
| 2017/0251332 A1* | 8/2017 | Aldana | ............... | G01S 5/0226 |

OTHER PUBLICATIONS

"International Application Serial No. PCT/US2017/039689, Written Opinion dated Oct. 30, 2017", 5 pgs.

Narendar, Madhavan, et al., "NDP Announcement for HE Sequence", IEEE 8O2.1I15/134Or2, (Nov. 10, 2015), 3-7.

Ross, Jian Yu, et al., "HE NDPA frame format", IEEE 802.1I16/O609rl, (May 18, 2016), 13-17.

"International Application Serial No. PCT/US2017/039689, International Preliminary Report on Patentability dated Jun. 27, 2019", 7 pgs.

* cited by examiner

BSS

| TYPE VALUE B3 B2 | TYPE DESCRIPTION | SUBTYPE VALUE B7 B6 B5 B4 | SUBTYPE DESCRIPTION |
|---|---|---|---|
| 00 | MANAGEMENT | 0000 | ASSOCIATION REQUEST |
| 00 | MANAGEMENT | 0001 | ASSOCIATION RESPONSE |
| 00 | MANAGEMENT | 0010 | REASSOCIATION REQUEST |
| 00 | MANAGEMENT | 0011 | REASSOCIATION RESPONSE |
| 00 | MANAGEMENT | 0100 | PROBE REQUEST |
| 00 | MANAGEMENT | 0101 | PROBE RESPONSE |
| 00 | MANAGEMENT | 0110 | TIMING ADVERTISEMENT |
| 00 | MANAGEMENT | 0111 | RESERVED |
| 00 | MANAGEMENT | 1000 | BEACON |
| 00 | MANAGEMENT | 1001 | ATIM |
| 00 | MANAGEMENT | 1010 | DISASSOCIATION |
| 00 | MANAGEMENT | 1011 | AUTHENTICATION |
| 00 | MANAGEMENT | 1100 | DEAUTHENTICATION |
| 00 | MANAGEMENT | 1101 | ACTION |
| 00 | MANAGEMENT | 1110 | ACTION NO ACK |
| 00 | MANAGEMENT | 1111 | RESERVED |
| 01 | CONTROL | 0000–0011 | RESERVED |
| 01 | CONTROL | 0100 | BEAMFORMING REPORT ROLL |
| 01 | CONTROL | 0101 | VHT NDP ANNOUNCEMENT |
| 01 | CONTROL | 0110 | CONTROL FRAME EXTENSION |
| 01 | CONTROL | 0111 | CONTROL WRAPPER |
| 01 | CONTROL | 1000 | BLOCK ACK REQUEST (BLOCKACKREQ) |
| 01 | CONTROL | 1001 | BLOCK ACK (BLOCKACK) |
| 01 | CONTROL | 1010 | PS-POLL |
| 01 | CONTROL | 1011 | RTS |
| 01 | CONTROL | 1100 | CTS |
| 01 | CONTROL | 1101 | ACK |

*FIG. 7*

| TYPE VALUE B3 B2 | TYPE DESCRIPTION | SUBTYPE VALUE B7 B6 B5 B4 | SUBTYPE DESCRIPTION |
|---|---|---|---|
| 01 | MANAGEMENT | 1110 | CF-END |
| 01 | MANAGEMENT | 1111 | CF-END + CF-ACK |
| 10 | DATA | 0000 | DATA |
| 10 | DATA | 0001 | DATA + CF-ACK |
| 10 | DATA | 0010 | DATA + CF-POLL |
| 10 | DATA | 0011 | DATA + CF-ACK + CF-POLL |
| 10 | DATA | 0100 | NULL (NO DATA) |
| 10 | DATA | 0101 | CF-ACK (NO DATA) |
| 10 | DATA | 0110 | CF-POLL (NO DATA) |
| 10 | DATA | 0111 | CF-ACK + CF-POLL (NO DATA) |
| 10 | DATA | 1000 | QOS DATA |
| 10 | DATA | 1001 | QOS DATA + CF-ACK |
| 10 | DATA | 1010 | QOS DATA + CF-POLL |
| 10 | DATA | 1011 | QOS DATA + CF-ACK + CF-POLL |
| 10 | DATA | 1100 | QOS NULL (NO DATA) |
| 10 | DATA | 1101 | RESERVED |
| 10 | DATA | 1110 | QOS CF-POLL (NO DATA) |
| 10 | DATA | 1111 | QOS CF-ACK + CF-POLL (NO DATA) |
| 11 | EXTENSION | 0000 | DMG BEACON |
| 11 | EXTENSION | 0001-1111 | RESERVED |

*FIG. 8*

SOUNDING SEQUENCE NULL DATA PACKET ANNOUNCEMENT INDICATION

PRIORITY CLAIM

The present application is a U.S. National Stage Filing under 35 U.S.C. 371 from International Application No. PCT/US2017/039689, filed Jun. 28, 2017 and published in English as WO 2018/111343 on Jun. 21, 2018, which claims the benefit of priority under 35 U.S.C. 119(e) to U.S. Provisional Patent Application Ser. No. 62/434,925, filed Dec. 15, 2016, entitled, "INDICATION OF NULL DATA PACKET ANNOUNCEMENT (NDPA) IN SOUNDING SEQUENCE OF IEEE 802.11AZ," each of which is incorporated herein by reference.

TECHNICAL FIELD

The disclosure herein pertains to wireless networks and wireless communications. Some embodiments relate to wireless local area networks (WLANs) and Wi-Fi networks including networks operating in accordance with the Institute of Electrical and Electronic Engineers (IEEE) 802.11 family of standards. Some embodiments relate to IEEE 802.11ax. Some embodiments relate to IEEE 802.11az. Some embodiments relate to methods, computer readable media, and apparatus for an indication of a null data packet (NDP) announcement (NDPA) in a sounding sequence of IEEE 802.11az.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 7 is a table that illustrates valid type and subtype combinations, in accordance with some embodiments;

FIG. 8 is a continuation of the table from FIG. 7;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Variations set forth in the claims encompass available equivalents of those claims.

Figure 1:
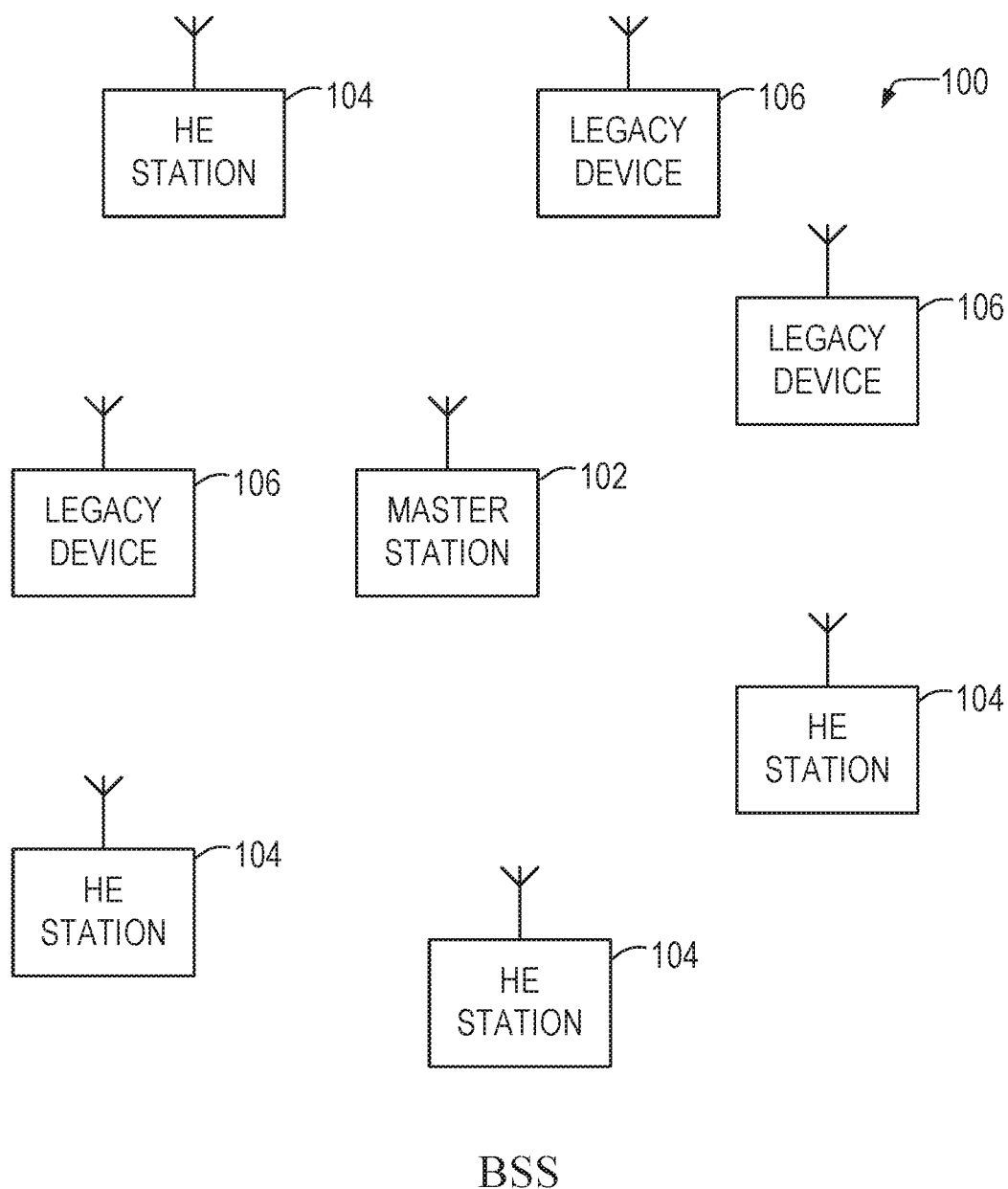
FIG. 1 is a block diagram illustrating a WLAN, in accordance with some embodiments.

FIG. 1 is a block diagram illustrating a WLAN 100 in accordance with some embodiments. The WLAN may comprise a basic service set (BSS) 100 that may include a master station 102, which may be an AP, a plurality of high-efficiency (HE) (e.g., IEEE 802.11ax) stations 104, and a plurality of legacy (e.g., IEEE 802.11n/ac) devices 106.

The master station 102 may be an AP using one of the IEEE 802.11 protocols to transmit and receive. The master station 102 may be a base station. The master station 102 may use other communications protocols as well as the IEEE 802.11 protocol. The IEEE 802.11 protocol may be IEEE 802.11ax, according to the first draft published Mar. 2, 2016. References to "IEEE 802.11ax", "802.11ax", and "IEEE 802.11ax Specification" herein refer to this disclosure. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). The master station 102 and/or HE station 104 may use one or both of MU-MIMO and OFDMA. There may be more than one master station 102 that is part of an extended service set (ESS). A controller (not illustrated) may store information that is common to the more than one master station 102. The controller may have access to an external network such as the Internet.

The legacy devices 106 may operate in accordance with one or more of IEEE 802.11 a/b/g/n/ac/ad/af/ah/aj, or another legacy wireless communication standard. The legacy devices 106 may be STAs or IEEE 802.11 STAs. The HE stations 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol such as IEEE 802.11az. In some embodiments, the HE stations 104, master station 102, and/or legacy devices 106 may be termed wireless devices. In some embodiments, the HE station 104 may be a "group owner" (GO) for peer-to-peer modes of operation where the HE station 104 may perform some operations of a master station 102.

The master station 102 may communicate with legacy devices 106 in accordance with legacy IEEE 802.11 communication techniques. In example embodiments, the master station 102 may also be configured to communicate with HE stations 104 in accordance with legacy IEEE 802.11 communication techniques.

In some embodiments, a HE frame may be configurable to have the same bandwidth as a channel. The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the channels may be based on a number of active subcarriers. In some embodiments the bandwidth of the channels are multiples of 26 (e.g., 26, 52, 104, etc.) active subcarriers or tones that are spaced by 20 MHz. In some embodiments the bandwidth of the channels are 26, 52, 104, 242, etc. active data subcarriers or tones that are space 20 MHz apart. In some embodiments the bandwidth of the channels is 256 tones spaced by 20 MHz. In some embodiments a 20 MHz channel may comprise 256 tones for a 256 point Fast Fourier Transform (FFT). In some embodiments, a different number of tones is used. In some embodiments, the orthogonal frequency division multiple-access (OFDMA) structure consists of a 26-subcarrier resource unit (RU), 52-subcarrier RU, 106-subcarrier RU, 242-subcarrier RU, 484-subcarrier RU and 996-subcarrier RU. Resource allocations for single user (SU) consist of a 242 subcarrier RU, 484-subcarrier RU, 996-subcarrier RU and 2×996-subcarrier RU.

An HE frame may be configured for transmitting a number of spatial streams, which may be in accordance with MU-MIMO. In some embodiments, a HE frame may be configured for transmitting in accordance with one or both of OFDMA and MU-MIMO. In other embodiments, the master station 102, HE station 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, WiMAX, WiGig, or other technologies.

Some embodiments relate to HE communications. In accordance with some IEEE 802.11ax embodiments, a master station 102 may operate as a master station which may be arranged to contend for a wireless medium (e.g., during a contention period) to receive exclusive control of the medium for an HE control period. In some embodiments, the HE control period may be termed a transmission opportunity (TXOP). The master station 102 may transmit a HE master-sync transmission, which may be a trigger frame or HE control and schedule transmission, at the beginning of the HE control period. The master station 102 may transmit a time duration of the TXOP and channel information. During the HE control period, HE stations 104 may communicate with the master station 102 in accordance with a non-contention based multiple access technique such as OFDMA and/or MU-MIMO. This is unlike conventional WLAN communications in which devices communicate in accordance with a contention-based communication technique, rather than a multiple access technique. During the HE control period, the master station 102 may communicate with HE stations 104 using one or more HE frames. During the HE control period, the HE STAs 104 may operate on a channel smaller than the operating range of the master station 102. During the HE control period, legacy stations refrain from communicating.

In accordance with some embodiments, during the master-sync transmission the HE STAs 104 may contend for the wireless medium with the legacy devices 106 being excluded from contending for the wireless medium during the master-sync transmission or TXOP. In some embodiments, the trigger frame may indicate an uplink (UL) UL-MU-MIMO and/or UL OFDMA control period. In some embodiments, the trigger frame may indicate portions of the TXOP that are contention based for some HE station 104 and portions that are not contention based.

In some embodiments, the multiple-access technique used during the HE control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

In example embodiments, the HE device 104 and/or the master station 102 are configured to perform the methods and operations herein described in conjunction with FIGS. 1-9.

"Beamforming" is a term used in communication protocols to spatially direct a wireless communications beam to a recipient. One use of beamforming is to have the master station 102 direct multiple beams to multiple HE stations 104 so that simultaneous communications with multiple users is possible. The directed beams can direct packets simultaneously to spatially diverse users with minimal interfere to one another which permits an overall increase in the traffic bandwidth of a network.

Transmit beamforming requires information about a channel state (channel state information (CSI)) in order to compute a steering matric (calculations that allow a phased array antenna to direct a beam in a particular direction). The beamforming may make use of "sounding" protocols, which is a process used by the transmitter to acquire CSI from each of the different communication devices. The beamformer sends training symbols to the receivers (beamformees) and waits for the receivers to provide explicit feedback containing a measure related to the channel. The feedback may then be used to create a weight or steering matrix that may be used to pre-code the data transmission by creating a set of steered beams.

In some embodiments, IEEE 802.11az is the next generation positioning protocol in WLAN, and the development of 802.11az is based on the next generation high efficiency WLAN 802.11ax. In some embodiments, in the measurement protocol of 802.11az, the round-trip time between the AP and STA is estimated, such that the STA's range information may be derived.

Figure 2:
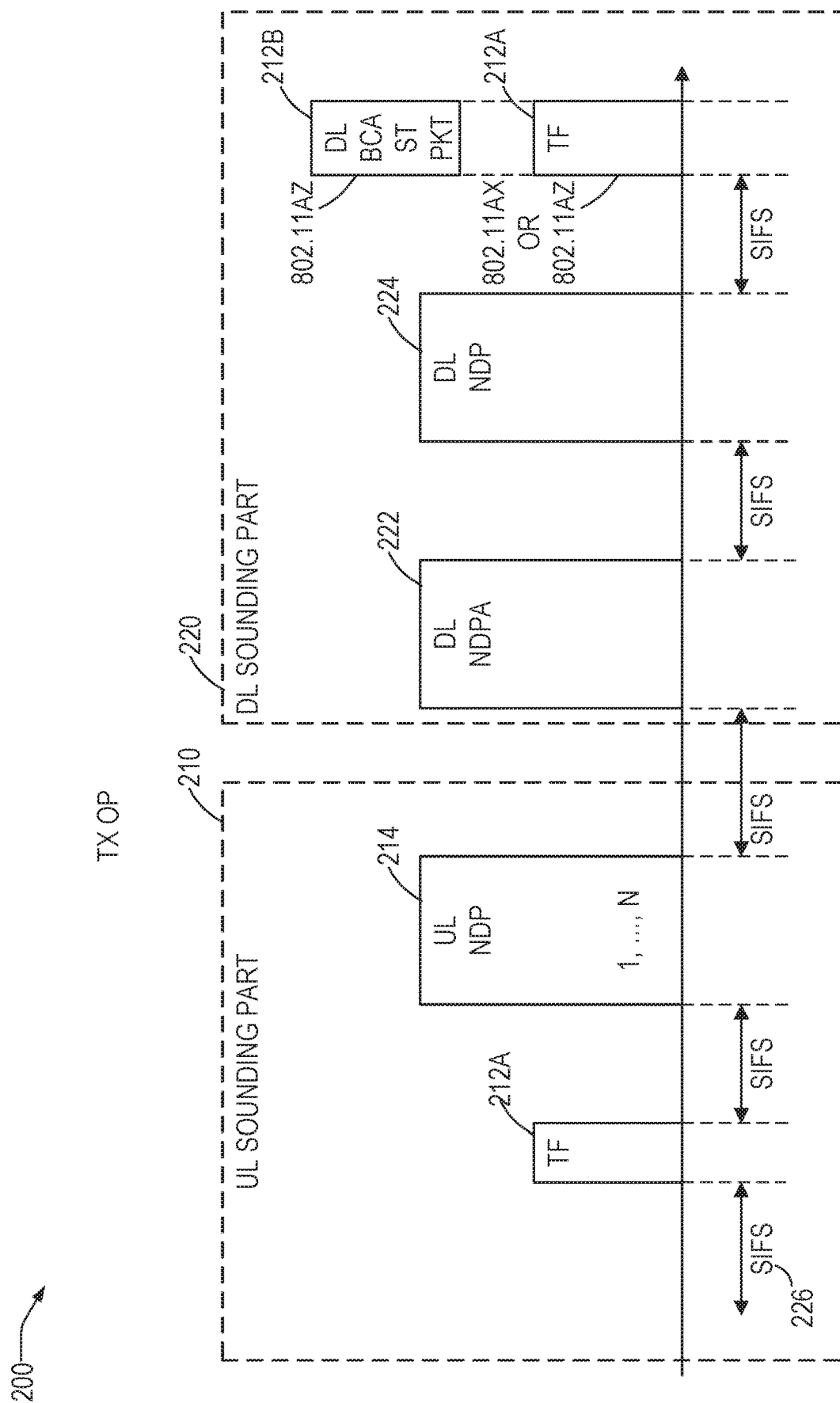
FIG. 2 is a timing diagram illustrating an example of a sounding sequence in the measurement protocol of IEEE 802.11az, in accordance with some embodiments.

FIG. 2 is a timing diagram illustrating an example 200 of a sounding sequence in the measurement protocol of IEEE 802.11ax and IEEE 802.11az, in accordance with some embodiments. In some embodiments, the sounding sequence design for the IEEE 802.11az protocol may maximally reuse the component in the IEEE 802.11ax protocol, despite having differences and not necessarily being fully compatible with the IEEE 802.11az protocol. In the uplink sounding part 210, for example, FIG. 2 illustrates a trigger frame (TF) 212A that may be sent by a beamformer, such as a master station 102 to a station STA 104. Information related to the channel conditions may be provided in an upload null data packet UL NDP 214 after a short interframe space (SIFS) 226 that allows processing of a received frame and response preparation.

FIG. 2 further illustrates a downlink sounding part 220 that illustrates a difference between the 802.11ax protocol and the 802.11az protocol. In both protocols, the beamformer indicates an intent to perform the sounding process by transmitting a download null data packet announcement DL NDPA frame 222, followed by a download null data packet DL NDP frame 224 after the SIFS 226. The DL NDPA 222 may contain an STA info field for each beamformee that is expected to prepare beamforming feedback, along with an STA identifier.

As shown in FIG. 2, according to the 802.11ax protocol, the trigger frame 212A is utilized by the master STA/AP to initiate a simultaneous uplink transmission 214 from each of the STAs. When the multiple users respond in unison with their information packets, the master STA/AP applies the channel matrix to the received beams, separation each uplink beam's information.

However, in the 802.11az protocol, in the alternative to a trigger frame 212A, a broadcast packet BCAST PKT 212B may be utilized by the AP to solicit information from the STAs. Advantageously, the BCAST PKT 212B may contain measurement data that may be utilized by the STA. A problem arises, however, if an 802.11az AP implements the sounding protocol using a BCAST PKT 212B when communicating with an 802.11ax STA. The STA is expecting a TF 212A to follow the NDPA 222 and NDP 224, not a BCAST PKT 212B, and will therefore miss the BCAST PKT 212 and find itself in an uncertain state awaiting a TF 212A that will never arrive.

Figure 3:
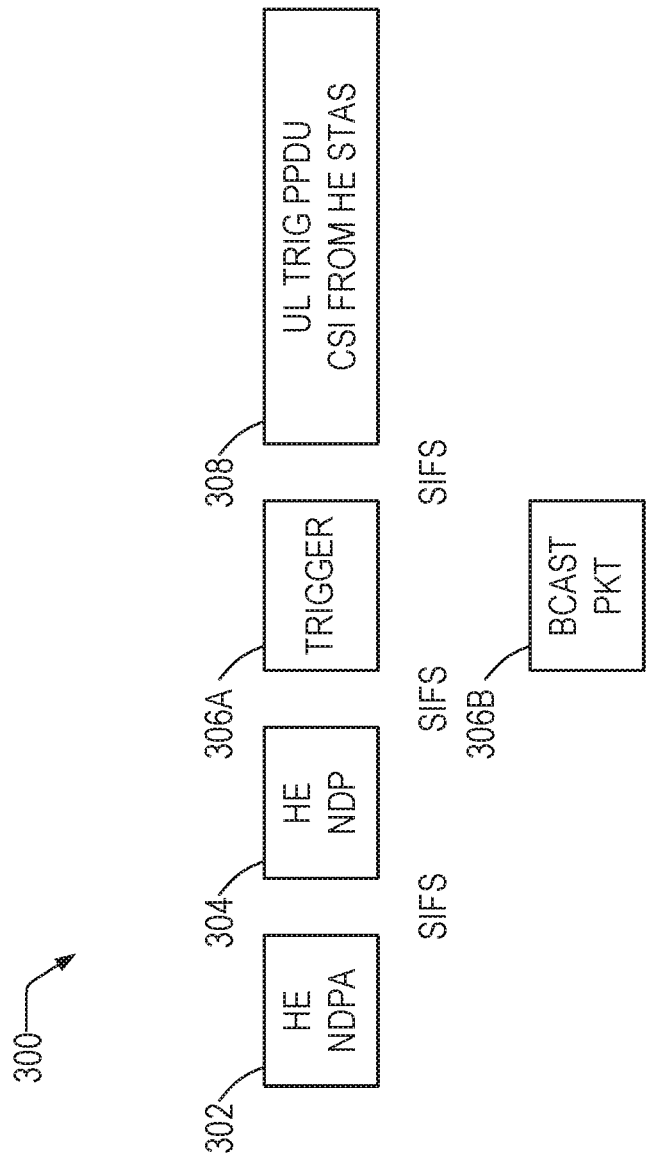
FIG. 3 is a timing diagram illustrating an example of the sounding protocol, in accordance with some embodiments.

FIG. 3 is a timing diagram illustrating an example of the sounding protocol sequence 300 in IEEE 802.11ax, in accordance with some embodiments. In some embodiments, in IEEE 802.11ax, after the downlink NDPA 302 and NDP 304 packets, the AP may send a downlink trigger frame 306 to solicit channel state information (CSI) feedback 308 from STAs. However, in some embodiments in the sounding sequence of 802.11az in FIG. 2, following the downlink NDPA 222 and NDP 224, it's not necessary for the AP to send a trigger frame 306 to solicit the CSI feedback 308 from the STA, and the AP may send a downlink broadcast packet to feed some measurement information back to STA.

When an IEEE 802.11ax or IEEE 802.11az STA receives the downlink NDPA 222 and NDP 224, it cannot tell whether this is a sounding sequence for IEEE 802.11az or IEEE 802.11ax, such that it may not behave correctly for the following packets. For example, the IEEE 802.11ax STA may keep waiting for a trigger frame 306, but the incoming packet maybe a downlink broadcast data packet, and this data packet may be missed.

Figure 4:
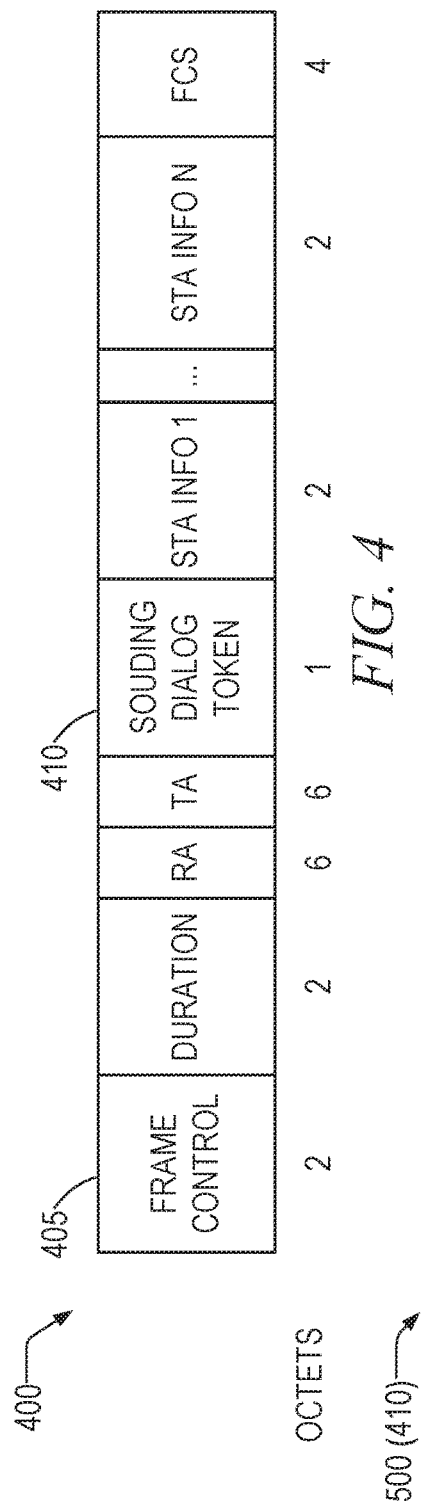
FIG. 4 is a block diagrams describing a frame format for the very high throughput (VHT) NDPA packet, in accordance with some embodiments.
Figure 5:
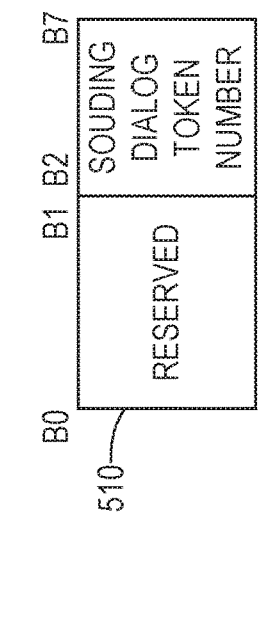
FIG. 5 is a block diagrams describing a frame format for the VHT NDPA packet, in accordance with some embodiments.
Figure 6:
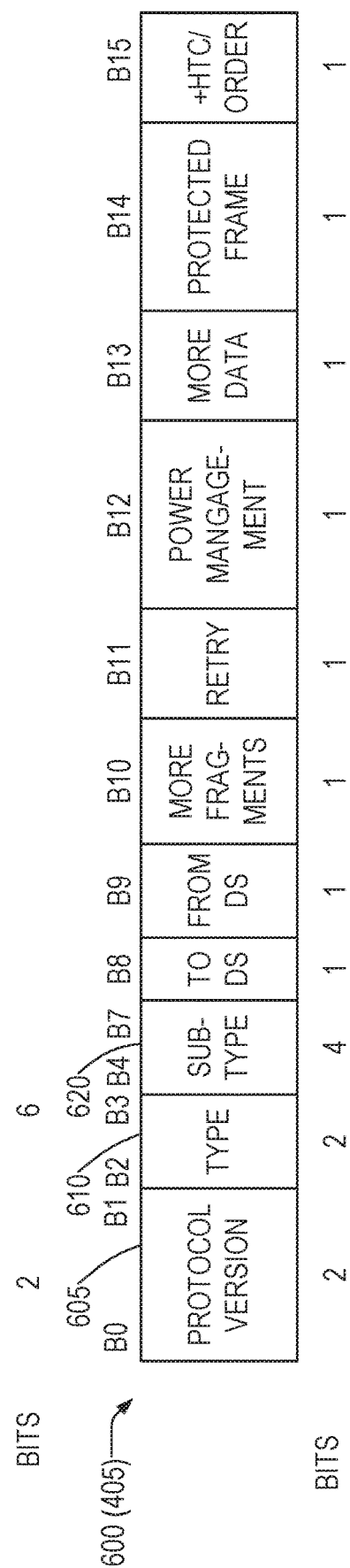
FIG. 6 is a block diagrams describing an example of the frame control field, in accordance with some embodiments.

Described herein are ways for differentiating the IEEE 802.11az NDPA 222 from that of the IEEE 802.11ax, such that after receiving the NDPA 222, the IEEE 802.11ax or IEEE 802.11az STAs will get ready for receiving various packets described herein. The IEEE 802.11az NDPA may have a similar structure to the IEEE 802.11ax NDPA, as shown in FIGS. 4-6. In the following discussion, an NDPA that has been determined to be an IEEE 802.11ax NDPA may be referred to as an XNDPA, and an NDPA that has been determined to be an IEEE 802.11az NDPA may be referred to as an ZNDPA.

In some embodiments, systems/devices/methods described herein may use reserved bits in the frame control or sounding dialog token fields of an NDPA packet 222 to define a format for the IEEE 802.11az NDPA 222, such that the NDPAs 222 for IEEE 802.11az and IEEE 802.11ax may be differentiated, even when utilizing a same basic structure for the NDPA 222. Previously, there has been no known solution for this issue. The term protocol information field (PIF) is defined herein to be generic reference to a contiguous field or to a combination of disjointed fields that may be used to delineate between the IEEE 802.11ax protocol and the IEEE 802.11az protocol.

FIGS. 4 and 5 are block diagrams describing frame format for the VHT NDPA packet 400, which are copied from the 802.11REVmc_D8.0. In some embodiments, two bits 510 are reserved in the sounding dialog token field 410. In some embodiments, the IEEE 802.11ax sounding protocol reuses the VHT NDPA frame 400 format, and when the bit B 1 of the sounding dialog token 410 is set to 1, then it indicates the NDPA 222 is an IEEE 802.11ax NDPA. Similarly, in some embodiments, the two reserved bits 510 may be used to distinguish between IEEE 802.11ax and IEEE 802.11az NDPAs 222.

FIG. 4 is a block diagrams describing a frame format 400 for the VHT NDPA packet, in accordance with some embodiments. FIG. 4 shows the VHP NDP Announcement frame format. FIG. 5 is a block diagrams describing a frame format for the VHT NDPA packet, in accordance with some embodiments, and shows the sounding dialog token field 500 (410).

In some embodiments, based on the sounding dialog token field 410, one or more of the following combinations of the reserved bits 510 may be used to indicate that the NPDA 222 is an IEEE 802.11az NDPA:

A) Setting both of B0 and B1 to 1.

B) Setting one of B0 and B1 to 1 and other one to 0 (there are two combinations for this case: 10 and 01, and one of this two combinations may be used by the 802.11ax protocol to indicate an 802.11ax NDPA and the other combination may be used to indicate an 802.11az NDPA).

C) Setting B0 to 0 and B1 to 0.

In one configuration, the 802.11ax bit setting of these reserved bits 510 is simply the NOT value of the 802.11az bit setting. This may apply to any of the bit setting configurations discussed herein.

In some embodiments, in the frame control field 405, there are also some reserved bits, which could be used as an indication for the NDPA 222 in the sounding sequence of IEEE 802.11az.

FIG. 6 is a block diagrams describing an example of the frame control field 600 (405) from IEEE 802.1 REVmc_D8.0. In some embodiments, the Type field 610 has 2 bits and the Subtype field 620 is 4 bits in length. When the Type field 610 is set to 11, the bit combinations 0001-1111 in the Subtype field are reserved as shown in the table illustrated in FIGS. 7 and 8.

FIG. 7 is a table that illustrates valid type and subtype combinations, in accordance with some embodiments. FIG. 8 is a continuation of the table in FIG. 7.

In some embodiments, based on the Type and Subtype fields, one of the reserved combinations of Type field and Subtype field may be used to indicate the NDPA 222 in IEEE 802.11az and some examples are listed below:

A) Setting Type field to 11 and selecting one combination from 0001-1111 for the Subtype field.

B) Setting Type field to 01 and selecting one combination from 0000-0011 for the Subtype field.

C) Setting Type field to 00 and selecting 1111 for the Subtype field.

In some embodiments, as shown in FIG. 6, in the frame control field 600, the protocol version control subfield 605 has 2 bits, and the bit combinations, 01, 10, and 11 are reserved. One of these reserved bit combinations may be selected to indicate the NDPA 222 in IEEE 802.11az. Some examples are:

A) Setting version control subfield to 01.
B) Setting version control subfield to 10.
C) Setting version control subfield to 11.

In the various arrangements discussed above, when an 802.11ax device receives an 802.11az NDPA, it may determine that the NDPA is not intended for it, and the 802.11ax device can discard the NDPA. When an 802.11az device receives an 802.11az NDPA, it may determine that the NDPA is intended for it, and expect an NDP packet after the SIFS of the NDPA.

Figures 9A, 9B:
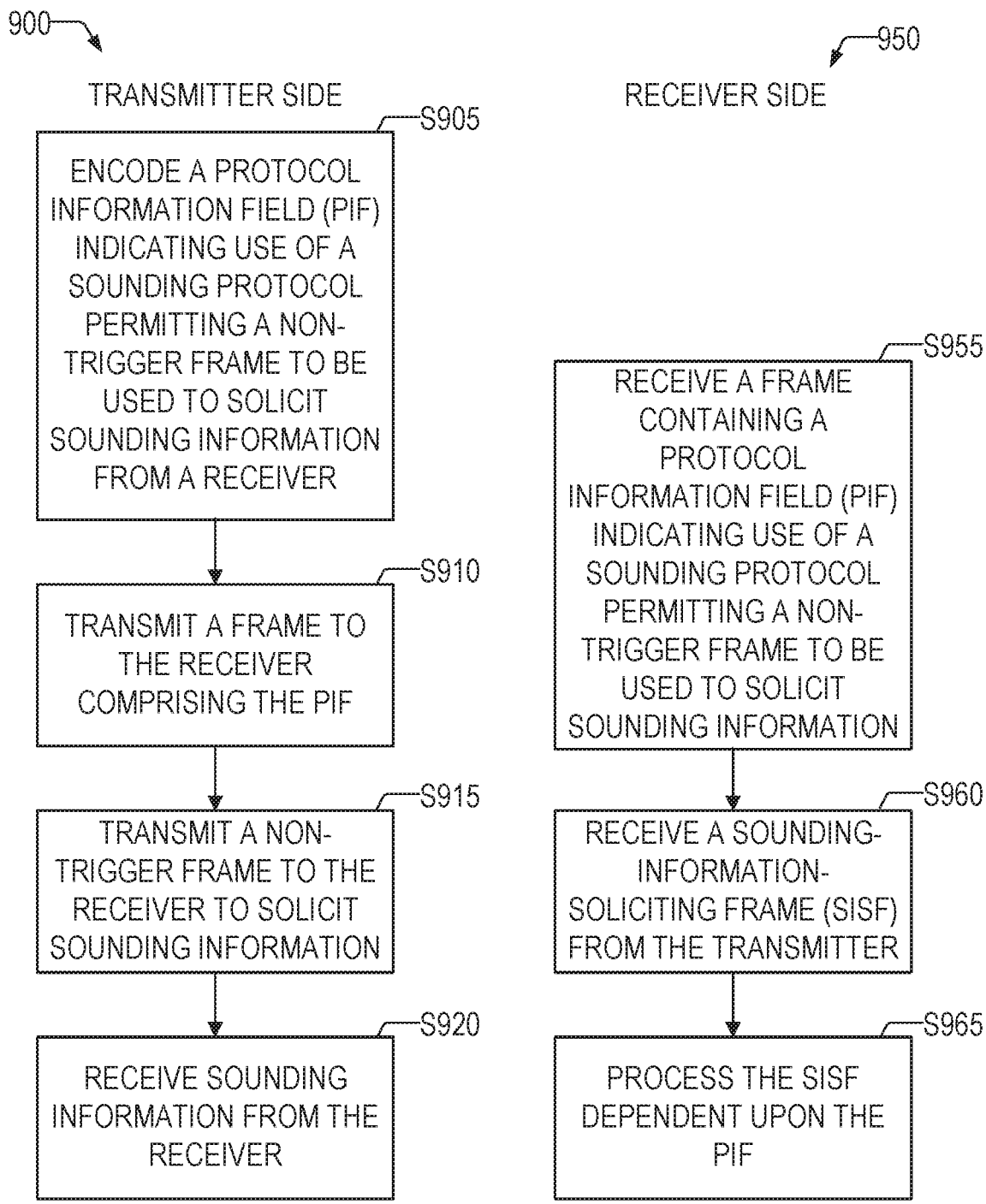
FIGS. 9A and 9B are flowcharts illustrating process flows from the transmitter (FIG. 9A) and the receiver (FIG. 9B) side, according to various embodiments.

FIGS. 9A and 9B are flowcharts illustrating process flows from the transmitter (FIG. 9A) and the receiver (FIG. 9B) side, according to various embodiments.

FIG. 9A is a flowchart for an example transmitter process 900. In operation S905, the transmitter may encode a protocol information field (PIF) indicating use of a sounding protocol permitting a non-trigger frame to be used to solicit sounding information from a receiver. The sounding information may be, for example, the CSI described above. An example of this protocol is IEEE 802.11az, and the PIF may be, for example, reserved bits described above in the NDPA or NDP of the IEEE 802.11ax protocol. The non-trigger frame may be, by way of example, the BCAST PKT described above.

In operation S910, the transmitter may transmit the frame comprising the PIF to the receiver. Subsequently, in operation S915, the non-trigger frame to solicit sounding information may be transmitted by the transmitter to the receiver. In operation S920, the transmitter receives the sounding information that was solicited from the receiver.

FIG. 9B is a flowchart for an example receiver process 950 corresponding to the transmitter process 900. In operation S955, the receiver may receive a frame containing the PIF indicating use of a sounding protocol (for example, that of IEEE 802.11az) permitting a non-trigger frame (for example, the BCAST PKT) to be used to solicit sounding information (for example, CSI). In operation S960, the receiver receives a non-trigger frame sounding-information-soliciting frame (SISF) from the transmitter. In operation S965, the receiver processes the SISF in a manner that is dependent upon the PIF. For example, if the PIF indicates that an IEEE 802.11az protocol is being used by the AP and the STA is using IEEE 802.11ax, the STA could reset the sounding protocol if a non-trigger frame is received following the NDPA and NDP transmissions by the AP.

Figure 10:
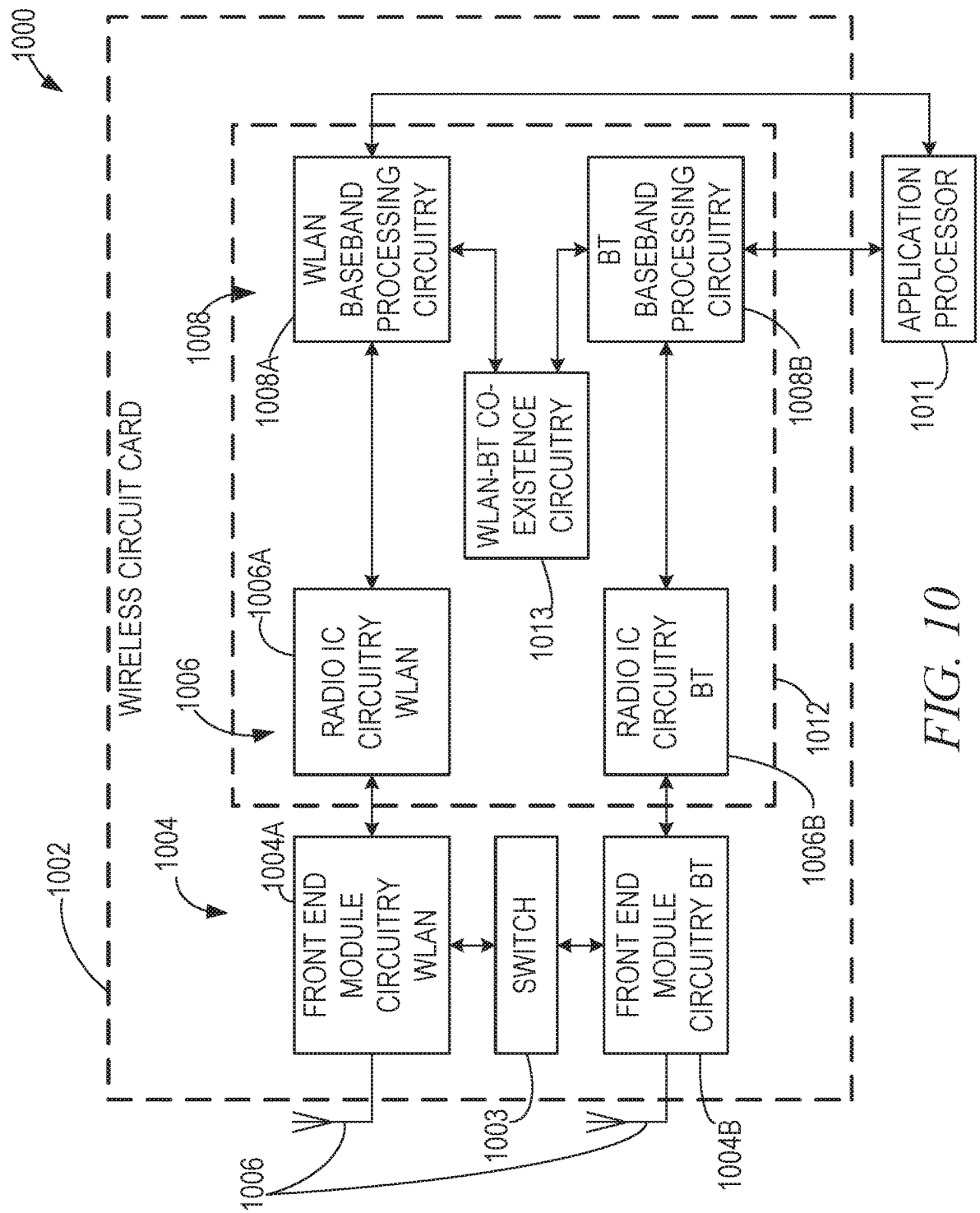
FIG. 10 is a block diagram of a radio architecture in accordance with some embodiments.

FIG. 10 is a block diagram of a radio architecture 1000 in accordance with some embodiments. Radio architecture 1000 may include radio front-end module (FEM) circuitry 1004, radio IC circuitry 1006 and baseband processing circuitry 1008. Radio architecture 1000 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1004 may include a WLAN or Wi-Fi FEM circuitry 1004A and a Bluetooth (BT) FEM circuitry 1004B. The WLAN FEM circuitry 1004A may include a receive signal path comprising circuitry configured to operate on WLAN RF signals received from one or more antennas 1001, to amplify the received signals and to provide the amplified versions of the received signals to the WLAN radio IC circuitry 1006A for further processing. The BT FEM circuitry 1004B may include a receive signal path which may include circuitry configured to operate on BT RF signals received from one or more antennas 1002, to amplify the received signals and to provide the amplified versions of the received signals to the BT radio IC circuitry 1006B for further processing. FEM circuitry 1004a may also include a transmit signal path which may include circuitry configured to amplify WLAN signals provided by the radio IC circuitry 1006A for wireless transmission by one or more of the antennas 1001. In addition, FEM circuitry 1004B may also include a transmit signal path which may include circuitry configured to amplify BT signals provided by the radio IC circuitry 1006B for wireless transmission by the one or more antennas. In the embodiment of FIG. 10, although FEM 1004A and FEM 1004B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1006 as shown may include WLAN radio IC circuitry 1006A and BT radio IC circuitry 1006B. The WLAN radio IC circuitry 1006A may include a receive signal path which may include circuitry to down-convert WLAN RF signals received from the FEM circuitry 1004A and provide baseband signals to WLAN baseband processing circuitry 1008A. BT radio IC circuitry 1006B may in turn include a receive signal path which may include circuitry to down-convert BT RF signals received from the FEM circuitry 1004B and provide baseband signals to BT baseband processing circuitry 1008B. WLAN radio IC circuitry 1006A may also include a transmit signal path which may include circuitry to up-convert WLAN baseband signals provided by the WLAN baseband processing circuitry 1008A and provide WLAN RF output signals to the FEM circuitry 1004A for subsequent wireless transmission by the one or more antennas 1001. BT radio IC circuitry 1006B may also include a transmit signal path which may include circuitry to up-convert BT baseband signals provided by the BT baseband processing circuitry 1008B and provide BT RF output signals to the FEM circuitry 1004B for subsequent wireless transmission by the one or more antennas 1001. In the embodiment of FIG. 10, although radio IC circuitries 1006A and 1006B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1008 may include a WLAN baseband processing circuitry 1008A and a BT baseband processing circuitry 1008B. The WLAN baseband processing circuitry 1008A may include a memory, such as, for example, a set of RAM arrays in a Fast Fourier Transform or Inverse Fast Fourier Transform block (not shown) of the WLAN baseband processing circuitry 1008A. Each of the WLAN baseband circuitry 1008A and the BT baseband circuitry 1008B may further include one or more processors and control logic to process the signals received from the corresponding WLAN or BT receive signal path of the radio IC circuitry 1006, and to also generate corresponding WLAN or BT baseband signals for the transmit signal path of the radio IC circuitry 1006. Each of the baseband processing circuitries 1008A and 1008B may further include physical layer (PHY) and medium access control layer (MAC) circuitry, and may further interface with application processor 1010 for generation and processing of the baseband signals and for controlling operations of the radio IC circuitry 1006.

Referring still to FIG. 10, according to the shown embodiment, WLAN-BT coexistence circuitry 1013 may include logic providing an interface between the WLAN baseband circuitry 1008A and the BT baseband circuitry 1008B to enable use cases requiring WLAN and BT coexistence. In addition, a switch 1003 may be provided between the WLAN FEM circuitry 1004A and the BT FEM circuitry 1004B to allow switching between the WLAN and BT radios according to application needs. In addition, although the antennas 1001 are depicted as being respectively connected to the WLAN FEM circuitry 1004A and the BT FEM circuitry 1004B, embodiments include within their scope the sharing of one or more antennas as between the WLAN and BT FEMs, or the provision of more than one antenna connected to each of FEM 1004A or 1004B.

In some embodiments, the front-end module circuitry 1004, the radio IC circuitry 1006, and baseband processing circuitry 1008 may be provided on a single radio card, such as wireless radio card 1002. In some other embodiments, the one or more antennas 1001, the FEM circuitry 1004 and the radio IC circuitry 1006 may be provided on a single radio card. In some other embodiments, the radio IC circuitry 1006 and the baseband processing circuitry 1008 may be provided on a single chip or integrated circuit (IC), such as IC 1012.

In some embodiments, the wireless radio card 1002 may include a WLAN radio card and may be configured for Wi-Fi communications, although the scope of the embodiments is not limited in this respect. In some of these embodiments, the radio architecture 1000 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1000 may be part of a Wi-Fi communication station (STA) such as a wireless access point (AP), a base station or a mobile device including a Wi-Fi device. In some of these embodiments, radio architecture 1000 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11 ac, and/or 802.11ax standards and/or proposed specifications for WLANs, although the scope of embodiments is not limited in this respect. Radio architecture 1000 may also be suitable to transmit and/or receive communications in accordance with other techniques and standards.

In some embodiments, the radio architecture 1000 may be configured for high-efficiency Wi-Fi (HEW) communications in accordance with the IEEE 802.11ax standard. In these embodiments, the radio architecture 1000 may be configured to communicate in accordance with an OFDMA technique, although the scope of the embodiments is not limited in this respect.

In some other embodiments, the radio architecture 1000 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 10, the BT baseband circuitry 1008B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 10, the radio architecture 1000 may be configured to establish a BT synchronous connection oriented (SCO) link and or a BT low energy (BT LE) link. In some of the embodiments that include functionality, the radio architecture 1000 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 10, the functions of a BT radio card and WLAN radio card may be combined on a single wireless radio card, such as single wireless radio card 1002, although embodiments are not so limited, and include within their scope discrete WLAN and BT radio cards In some embodiments, the radio-architecture 1000 may include other radio cards, such as a cellular radio card configured for cellular (e.g., 3GPP such as LTE, LTE-Advanced or 5G communications).

In some IEEE 802.11 embodiments, the radio architecture 1000 may be configured for communication over various channel bandwidths including bandwidths having center frequencies of about 900 MHz, 2.4 GHz, 5 GHz, and bandwidths of about 10 MHz, 2 MHz, 2.5 MHz, 4 MHz, 5 MHz, 8 MHz, 60 MHz, 66 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 11:
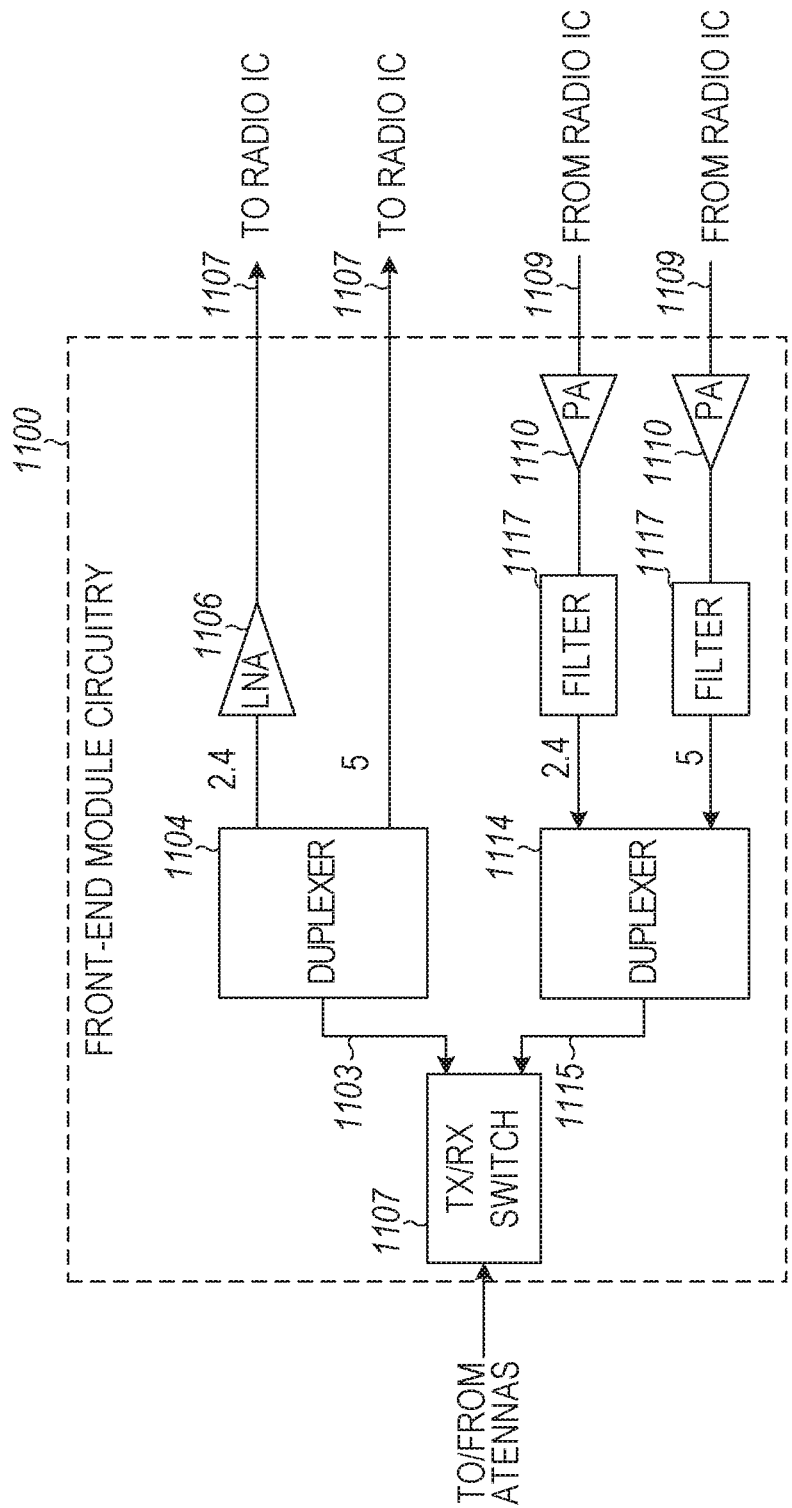
FIG. 11 is a block diagram that illustrates FEM circuitry in accordance with some embodiments.

FIG. 11 is a block diagram that illustrates FEM circuitry 1100 in accordance with some embodiments. The FEM circuitry 1100 is one example of circuitry that may be suitable for use as the WLAN and/or BT FEM circuitry 1004A/1004B (FIG. 10), although other circuitry configurations may also be suitable.

In some embodiments, the FEM circuitry 1100 may include a TX/RX switch 1102 to switch between transmit mode and receive mode operation. The FEM circuitry 1100 may include a receive signal path and a transmit signal path. The receive signal path of the FEM circuitry 1100 may include a low-noise amplifier (LNA) 1106 to amplify received RF signals 1103 and provide the amplified received RF signals 1107 as an output (e.g., to the radio IC circuitry 1006 (FIG. 10)). The transmit signal path of the circuitry 1100 may include a power amplifier (PA) to amplify input RF signals 1109 (e.g., provided by the radio IC circuitry 1006), and one or more filters 1112, such as band-pass filters (BPFs), low-pass filters (LPFs) or other types of filters, to generate RF signals 1115 for subsequent transmission (e.g., by one or more of the antennas 1006 (FIG. 10)).

In some dual-mode embodiments for Wi-Fi communication, the FEM circuitry 1100 may be configured to operate in either the 2.4 GHz frequency spectrum or the 5 GHz frequency spectrum. In these embodiments, the receive signal path of the FEM circuitry 1100 may include a receive signal path duplexer 1104 to separate the signals from each spectrum as well as provide a separate LNA 1106 for each spectrum as shown. In these embodiments, the transmit signal path of the FEM circuitry 1100 may also include a power amplifier 1110 and a filter 1112, such as a BPF, a LPF or another type of filter for each frequency spectrum and a transmit signal path duplexer 1114 to provide the signals of one of the different spectrums onto a single transmit path for subsequent transmission by the one or more of the antennas 1001 (FIG. 10). In some embodiments, BT communications may utilize the 2.4 GHZ signal paths and may utilize the same FEM circuitry 1100 as the one used for WLAN communications.

Figure 12:
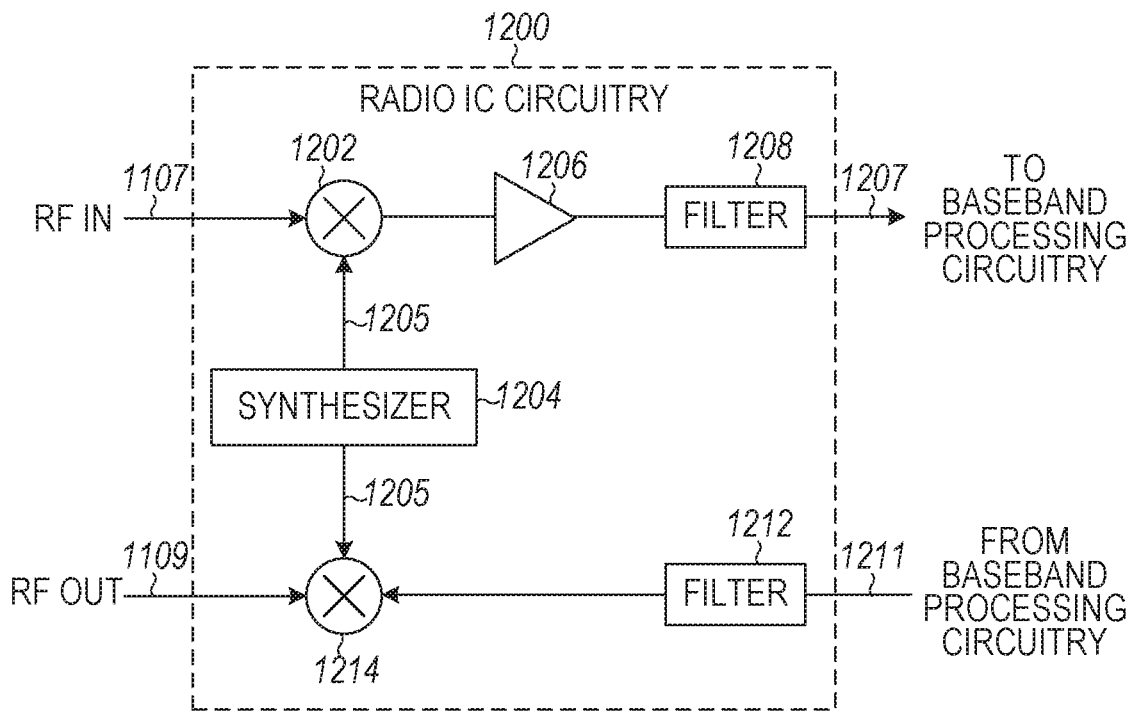
FIG. 12 is a block diagram that illustrates radio IC circuitry in accordance with some embodiments.

FIG. 12 is a block diagram that illustrates radio IC circuitry 1200 in accordance with some embodiments. The radio IC circuitry 1200 is one example of circuitry that may be suitable for use as the WLAN or BT radio IC circuitry 1006A/1006B (FIG. 10), although other circuitry configurations may also be suitable.

In some embodiments, the radio IC circuitry 1200 may include a receive signal path and a transmit signal path. The receive signal path of the radio IC circuitry 1200 may include at least mixer circuitry 1202, such as, for example, down-conversion mixer circuitry, amplifier circuitry 1206 and filter circuitry 1208. The transmit signal path of the radio IC circuitry 1200 may include at least filter circuitry 1212 and mixer circuitry 1214, such as, for example, up-conversion mixer circuitry. Radio IC circuitry 1200 may also include synthesizer circuitry 1204 for synthesizing a frequency 1205 for use by the mixer circuitry 1202 and the mixer circuitry 1214. The mixer circuitry 1202 and/or 1214 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 12 illustrates only a simplified version of a radio IC circuitry, and may include, although not shown, embodiments where each of the depicted circuitries may include more than one component. For instance, mixer circuitry 1220 and/or 1214 may each include one or more mixers, and filter circuitries 1208 and/or 1212 may each include one or more filters, such as one or more BPFs and/or LPFs according to application needs. For example, when mixer circuitries are of the direct-conversion type, they may each include two or more mixers.

In some embodiments, mixer circuitry 1202 may be configured to down-convert RF signals 1107 received from the FEM circuitry 1004 (FIG. 10) based on the synthesized frequency 1205 provided by synthesizer circuitry 1204. The amplifier circuitry 1206 may be configured to amplify the down-converted signals and the filter circuitry 1208 may include a LPF configured to remove unwanted signals from the down-converted signals to generate output baseband signals 1207. Output baseband signals 1207 may be provided to the baseband processing circuitry 1008 (FIG. 10) for further processing. In some embodiments, the output baseband signals 1207 may be zero-frequency baseband signals, although this is not a requirement. In some embodiments, mixer circuitry 1202 may comprise passive mixers, although the scope of the embodiments is not limited in this respect.

In some embodiments, the mixer circuitry 1214 may be configured to up-convert input baseband signals 1211 based on the synthesized frequency 1205 provided by the synthesizer circuitry 1204 to generate RF output signals 1109 for the FEM circuitry 1004. The baseband signals 1211 may be provided by the baseband processing circuitry 1008 and may be filtered by filter circuitry 1212. The filter circuitry 1212 may include a LPF or a BPF, although the scope of the embodiments is not limited in this respect.

In some embodiments, the mixer circuitry 1202 and the mixer circuitry 1214 may each include two or more mixers and may be arranged for quadrature down-conversion and/or up-conversion respectively with the help of synthesizer 1204. In some embodiments, the mixer circuitry 1202 and the mixer circuitry 1214 may each include two or more mixers each configured for image rejection (e.g., Hartley image rejection). In some embodiments, the mixer circuitry 1202 and the mixer circuitry 1214 may be arranged for direct down-conversion and/or direct up-conversion, respectively. In some embodiments, the mixer circuitry 1202 and the mixer circuitry 1214 may be configured for super-heterodyne operation, although this is not a requirement.

Mixer circuitry 1202 may comprise, according to one embodiment: quadrature passive mixers (e.g., for the in-phase (I) and quadrature phase (Q) paths). In such an embodiment, RF input signal 1107 from FIG. 12 may be down-converted to provide I and Q baseband output signals to be sent to the baseband processor Quadrature passive mixers may be driven by zero and ninety degree time-varying LO switching signals provided by a quadrature circuitry which may be configured to receive a LO frequency (fLO) from a local oscillator or a synthesizer, such as LO frequency 1205 of synthesizer 1204 (FIG. 12). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 115% duty cycle and a 100% offset. In some embodiments, each branch of the mixer circuitry (e.g., the in-phase (I) and quadrature phase (Q) path) may operate at a 115% duty cycle, which may result in a significant reduction is power consumption.

The RF input signal 1107 (FIG. 11) may comprise a balanced signal, although the scope of the embodiments is not limited in this respect. The I and Q baseband output signals may be provided to low-nose amplifier, such as amplifier circuitry 1206 (FIG. 12) or to filter circuitry 1208 (FIG. 12).

In some embodiments, the output baseband signals 1207 and the input baseband signals 1211 may be analog baseband signals, although the scope of the embodiments is not limited in this respect. In some alternate embodiments, the output baseband signals 1207 and the input baseband signals 1211 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1204 may be a fractional-N synthesizer or a fractional N/N+1 synthesizer, although the scope of the embodiments is not limited in this respect as other types of frequency synthesizers may be suitable. For example, synthesizer circuitry 1204 may be a delta-sigma synthesizer, a frequency multiplier, or a synthesizer comprising a phase-locked loop with a frequency divider. According to some embodiments, the synthesizer circuitry 1204 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1204 may be provided by a voltage controlled oscillator (VCO), although that is not a requirement. A divider control input may further be provided by either the baseband processing circuitry 1008 (FIG. 10) or the application processor 1010 (FIG. 10) depending on the desired output frequency 1205. In some embodiments, a divider control input (e.g., N) may be determined from a look-up table (e.g., within a Wi-Fi card) based on a channel number and a channel center frequency as determined or indicated by the application processor 1010.

In some embodiments, synthesizer circuitry 1204 may be configured to generate a carrier frequency as the output frequency 1205, while in other embodiments, the output frequency 1205 may be a fraction of the carrier frequency (e.g., one-half the carrier frequency, one-third the carrier frequency). In some embodiments, the output frequency 1205 may be a LO frequency (fLO).

Figure 13:
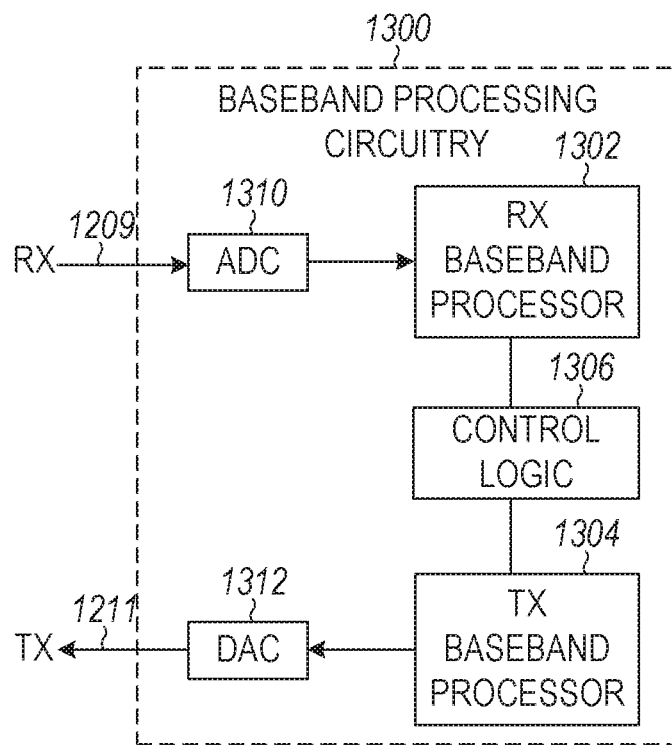
FIG. 13 is a functional block diagram of baseband processing circuitry in accordance with some embodiments.

FIG. 13 is a functional block diagram of baseband processing circuitry 1300 in accordance with some embodiments. The baseband processing circuitry 1300 is one example of circuitry that may be suitable for use as the baseband processing circuitry 1008 (FIG. 10), although other circuitry configurations may also be suitable. The baseband processing circuitry 1300 may include a receive baseband processor (RX BBP) 1302 for processing receive baseband signals 1209 provided by the radio IC circuitry 1006 (FIG. 10) and a transmit baseband processor (TX BBP) 1304 for generating transmit baseband signals 1211 for the radio IC circuitry 1006. The baseband processing circuitry 1300 may also include control logic 1306 for coordinating the operations of the baseband processing circuitry 1300.

In some embodiments (e.g., when analog baseband signals are exchanged between the baseband processing circuitry 1300 and the radio IC circuitry 1006), the baseband processing circuitry 1300 may include ADC 1310 to convert analog baseband signals received from the radio IC circuitry 1006 to digital baseband signals for processing by the RX BBP 1302. In these embodiments, the baseband processing circuitry 1300 may also include DAC 1312 to convert digital baseband signals from the TX BBP 1304 to analog baseband signals.

In some embodiments that communicate OFDM signals or OFDMA signals, such as through baseband processor 1008A, the transmit baseband processor 1304 may be configured to generate OFDM or OFDMA signals as appropriate for transmission by performing an inverse fast Fourier transform (IFFT). The receive baseband processor 1302 may be configured to process received OFDM signals or OFDMA signals by performing an FFT. In some embodiments, the receive baseband processor 1302 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 10, in some embodiments, the antennas 1001 (FIG. 10) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1001 may each include a set of phased-array antennas, although embodiments are not so limited.

Although the radio-architecture 1000 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 14:
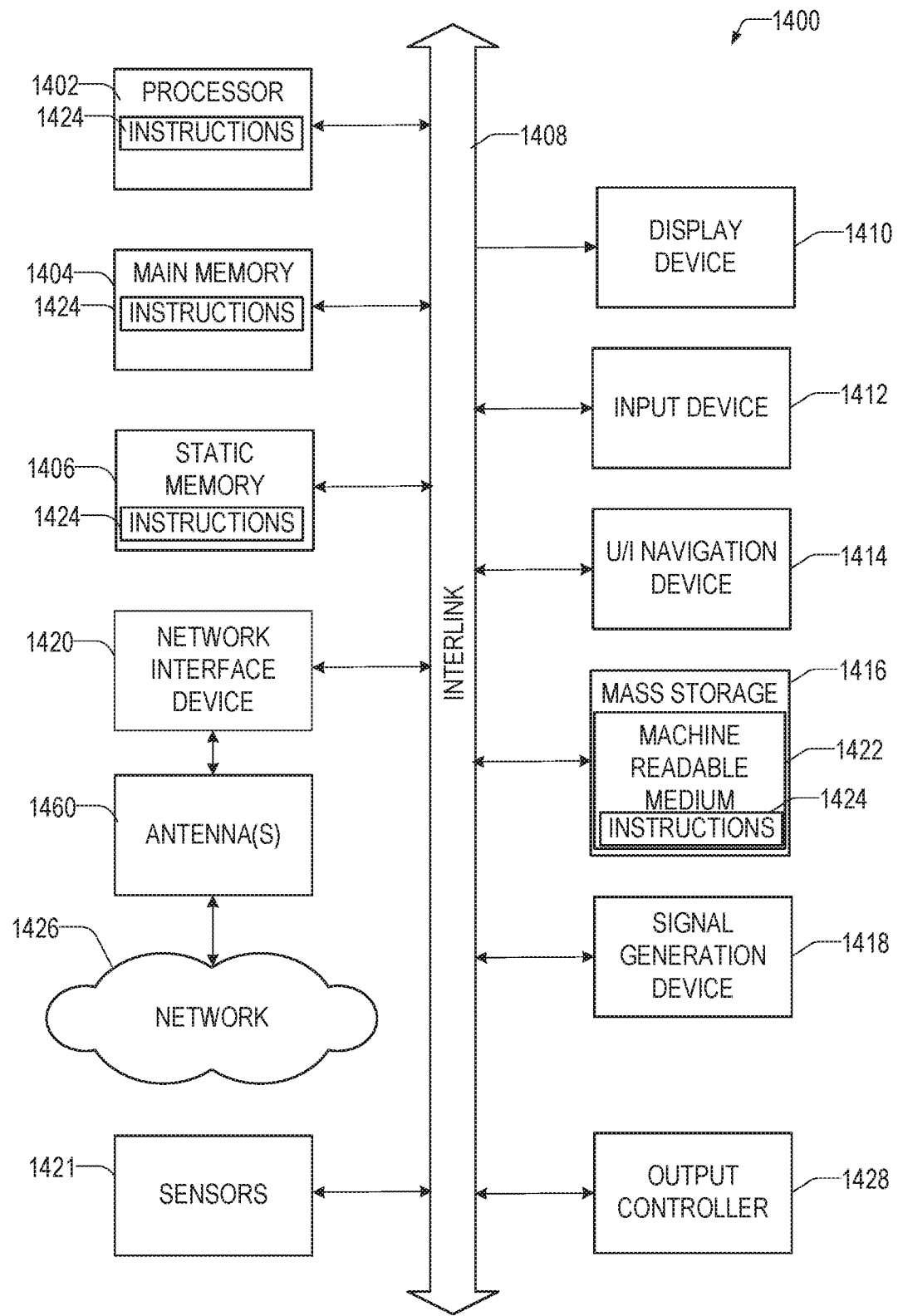
FIG. 14 is a block diagram of an example machine upon which any one or more of the techniques (e.g., methodologies) discussed herein may perform.

FIG. 14 illustrates a block diagram of an example machine 1400 upon which any one or more of the techniques (e.g., methodologies) discussed herein may perform. In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. The machine 1400 may be a master station 102, HE station 104, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" may also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408. The machine 1400 may further include a display device 1410, an input device 1412 (e.g., a keyboard), and a user interface (UI) navigation device 1414 (e.g., a mouse). In an example, the display device 1410, input device 1412 and UI navigation device 1414 may be a touch screen display. The machine 1400 may additionally include a mass storage (e.g., drive unit) 1416, a signal generation device 1418 (e.g., a speaker), a network interface device 1420, and one or more sensors 1421, such as a global positioning system (GPS) sensor, compass, accelerometer, or other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1402 and/or instructions 1424 may comprise processing circuitry and/or transceiver circuitry.

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the storage device 1416 may constitute machine readable media.

While the machine readable medium 1422 is illustrated as a single medium, the term "machine readable medium" may include a single medium or multiple media (e.g., a centralized or distributed database, and/or associated caches and servers) configured to store the one or more instructions 1424.

An apparatus of the machine 1400 may be one or more of a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408.

The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1424 may further be transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1420 may include one or more physical jacks (e.g., Ethernet, coaxial, or phone jacks) or one or more antennas to connect to the communications network 1426. In an example, the network interface device 1420 may include one or more antennas 1460 to wirelessly communicate using at least one of single-input multiple-output (SIMO), multiple-input multiple-output (MIMO), or multiple-input single-output (MISO) techniques. In some examples, the network interface device 1420 may wirelessly communicate using Multiple User MIMO techniques. The term "transmission medium" may be taken to include any intangible medium that is capable of storing, encoding or carrying instructions for execution by the machine 1400, and includes digital or analog communications signals or other intangible medium to facilitate communication of such software.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

EXAMPLES

Example 1 is an apparatus of a wireless transceiver device to implement a sounding protocol in a wireless network, the apparatus comprising a transmitter; a receiver; memory; and processing circuitry coupled to the memory, the processing circuitry configured to: encode a protocol information field (PIF) indicating use of a sounding protocol permitting a non-trigger frame to be used to solicit sounding information from a remote transceiver device; control the transmitter to transmit an announcement frame comprising the PIF to the remote transceiver device; control the transmitter to transmit a non-trigger frame to the remote transceiver device to solicit sounding information from the remote transceiver device; and control the receiver to receive the sounding information from the remote transceiver device based on the non-trigger frame.

In Example 2, the subject matter of Example 1 optionally includes wherein the PIF is one of a frame control field (FCF) or a sounding dialog token field (SDTF) of the announcement frame to indicate to the remote transceiver device that a communication different from a trigger frame may follow, wherein the announcement frame is a null data packet announcement (NDPA) frame.

In Example 3, the subject matter of Example 2 optionally includes wherein the PIF of the NDPA is a first SDTF field located at a beginning of the SDTF and that is two bits long.

In Example 4, the subject matter of any one or more of Examples 1-3 optionally include wherein the encoded field is the FCF.

In Example 5, the subject matter of Example 4 optionally includes wherein the encoded field is a type field of the FCF.

In Example 6, the subject matter of Example 5 optionally includes wherein the encoded field is the type field and a subtype field of the FCF.

In Example 7, the subject matter of any one or more of Examples 5-6 optionally include wherein: the FCF is located at a first octet of the NDPA and is two octets long; the type filed of the FCF is located at a third bit position of the FCF and is two bits long; and the subtype field of the FCF is located at a fifth position of the FCF and is two bits long.

In Example 8, the subject matter of Example 7 optionally includes

In Example 9, the subject matter of Example 8 optionally includes wherein the encoded field is: the type field having a binary value of 00 and the subtype field having a binary value of 1111; the type field having a binary value of 01 and the subtype field having a binary value of 0000-0011; or the type field having a binary value of 11 and the subtype field having a binary value of 0001-1111.

In Example 10, the subject matter of any one or more of Examples 4-9 optionally include wherein the PIF is a protocol version field (PVF) of the FCF.

In Example 11, the subject matter of Example 10 optionally includes wherein the PVF is a non-zero value.

In Example 12, the subject matter of Example 11 optionally includes wherein the PVF is located at a first bit of the FCF and is two bits long.

In Example 13, the subject matter of any one or more of Examples 1-12 optionally include wherein the non-trigger frame is a broadcast packet frame comprising measurement information for the remote transceiver device.

Example 14 is a method performed by a component of a wireless transceiver device to implement a sounding protocol in a wireless network, comprising, with a processor of the component: encoding a protocol information field (PIF) indicating use of a sounding protocol permitting a non-trigger frame to be used to solicit sounding information from a remote transceiver device; controlling the transmitter to transmit an announcement frame comprising the PIF to the remote transceiver device; controlling the transmitter to transmit a non-trigger frame to the remote transceiver device to solicit sounding information from the remote transceiver device; and controlling the receiver to receive the sounding information from the remote transceiver device based on the non-trigger frame.

In Example 15, the subject matter of Example 14 optionally includes wherein the PIF is one of a frame control field (FCF) or a sounding dialog token field (SDTF) of the announcement frame to indicate to the remote transceiver device that a communication different from a trigger frame may follow, wherein the announcement frame is a null data packet announcement (NDPA) frame.

In Example 16, the subject matter of Example 15 optionally includes wherein the PIF is the SDTF.

In Example 17, the subject matter of Example 16 optionally includes wherein the PIF of the NDPA is a first SDTF field located at a beginning of the SDTF and that is two bits long.

In Example 18, the subject matter of any one or more of Examples 15-17 optionally include wherein the PIF is the FCF.

In Example 19, the subject matter of Example 18 optionally includes wherein the PIF is a type field of the FCF.

In Example 20, the subject matter of Example 19 optionally includes wherein the PIF is the type field and a subtype field of the FCF.

In Example 21, the subject matter of Example 20 optionally includes wherein: the FCF is located at a first octet of the NDPA and is two octets long; the type filed of the FCF is located at a third bit position of the FCF and is two bits long; and the subtype field of the FCF is located at a fifth position of the FCF and is two bits long.

In Example 22, the subject matter of Example 21 optionally includes wherein the PIF is the type field having a binary value of 00, 01, or 11.

In Example 23, the subject matter of Example 22 optionally includes wherein the PIF is: the type field having a binary value of 00 and the subtype field having a binary value of 1111; the type field having a binary value of 01 and the subtype field having a binary value of 0000-0011; or the type field having a binary value of 11 and the subtype field having a binary value of 0001-1111.

Example 24 is a computer program product comprising one or more computer readable storage media comprising computer-executable instructions operable to, when executed by processing circuitry of a device, configure the device to perform any of the methods of Examples 14-23.

Example 25 is a system comprising means to perform any of the methods of Examples 14-23.

Example 26 is an apparatus of a wireless communications device utilizing an Institute of Electrical and Electronic Engineers (IEEE) 802.11az protocol, the apparatus comprising memory; and processing circuitry coupled to the memory, the processing circuitry configured to: encode a protocol information field (PIF) that is one of a frame control field (FCF) or a sounding dialog token field (SDTF) of a null data packet announcement (NDPA) packet as defined in an IEEE 802.11ax Specification to indicate an NDPA format for an IEEE 802.11az Specification that is a ZNDPA; and configure the wireless device to transmit the ZNDPA packet to one or more stations.

In Example 27, the subject matter of Example 26 optionally includes wherein the PIF is the SDTF.

In Example 28, the subject matter of any one or more of Examples 26-27 optionally include wherein the PIF is the FCF.

In Example 29, the subject matter of Example 28 optionally includes wherein the PIF is a type field of the FCF.

In Example 30, the subject matter of Example 29 optionally includes wherein the PIF is the type field and a subtype field of the FCF.

In Example 31, the subject matter of Example 30 optionally includes wherein the PIF is the type field having a value of 00, 01, or 11.

In Example 32, the subject matter of Example 31 optionally includes wherein the PIF is: the type field having a value of 00 and the subtype field having a value of 1111; the type field having a value of 01 and the subtype field having a value of 0000-0011; or the type field having a value of 11 and the subtype field having a value of 0001-1111.

In Example 33, the subject matter of any one or more of Examples 28-32 optionally include wherein the PIF is a protocol version field (PVF) of the FCF.

In Example 34, the subject matter of Example 33 optionally includes wherein the PVF is a non-zero value.

In Example 35, the subject matter of any one or more of Examples 26-34 optionally include transceiver circuitry coupled to the processing circuitry.

In Example 36, the subject matter of any one or more of Examples 26-35 optionally include one or more antennas coupled to the transceiver circuitry.

Example 37 is a method performed by a wireless device utilizing an Institute of Electrical and Electronic Engineers (IEEE) 802.11az protocol, the method comprising: encoding a protocol information field (PIF) that is one of a frame control field (FCF) or a sounding dialog token field (SDTF) of a null data packet announcement (NDPA) packet as defined in an IEEE 802.11ax Specification to indicate an NDPA format for an IEEE 802.11az Specification that is a ZNDPA; and configuring the wireless device to transmit the ZNDPA packet to one or more stations.

In Example 38, the subject matter of Example 37 optionally includes wherein the PIF is the SDTF.

In Example 39, the subject matter of any one or more of Examples 37-38 optionally include wherein the PIF is the FCF.

In Example 40, the subject matter of Example 39 optionally includes wherein the PIF is a type field of the FCF.

In Example 41, the subject matter of Example 40 optionally includes wherein the PIF is the type field and a subtype field of the FCF.

In Example 42, the subject matter of Example 41 optionally includes wherein the PIF is the type field having a value of 00, 01, or 11.

In Example 43, the subject matter of Example 42 optionally includes wherein the PIF is: the type field having a value of 00 and the subtype field having a value of 1111; the type field having a value of 01 and the subtype field having a value of 0000-0011 or the type field having a value of 11 and the subtype field having a value of 0001-1111.

In Example 44, the subject matter of any one or more of Examples 39-43 optionally include wherein the PIF is a protocol version field (PVF) of the FCF.

In Example 45, the subject matter of Example 44 optionally includes wherein the PVF is a non-zero value.

In Example 46, the subject matter of any one or more of Examples 37-45 optionally include transmitting the ZNDPA packet to one or more stations utilizing transceiver circuitry coupled to the processing circuitry.

In Example 47, the subject matter of Example 46 optionally includes transmitting the ZNDPA packet over one or more antennas coupled to the transceiver circuitry.

Example 48 is a computer program product comprising one or more computer readable storage media comprising computer-executable instructions operable to, when executed by processing circuitry of a device, configure the device to perform any of the methods of Examples 37-47.

Example 49 is a computer-readable storage medium that stores instructions for execution by one or more processors, the instructions to configure the one or more processors to cause a wireless device to: encode a protocol information field (PIF) indicating use of a sounding protocol permitting a non-trigger frame to be used to solicit sounding information from a remote transceiver device; control the transmitter to transmit an announcement frame comprising the PIF to the remote transceiver device; control the transmitter to transmit a non-trigger frame to the remote transceiver device to solicit sounding information from the remote transceiver device; and control the receiver to receive the sounding information from the remote transceiver device based on the non-trigger frame.

In Example 50, the subject matter of Example 49 optionally includes wherein the PIF is the FCF.

Example 51 is a system comprising means to perform any of the methods of Examples 37-47.

Example 52 is a system comprising means to perform any of the methods of Examples 37-47.

Example 53 is an apparatus of a wireless communications device, comprising: encode a protocol information field (PIF) indicating use of a sounding protocol permitting a non-trigger frame to be used to solicit sounding information from a remote transceiver device; control the transmitter to transmit an announcement frame comprising the PIF to the remote transceiver device; control the transmitter to transmit a non-trigger frame to the remote transceiver device to solicit sounding information from the remote transceiver device; and control the receiver to receive the sounding information from the remote transceiver device based on the non-trigger frame.

In Example 54, the subject matter of Example 53 optionally includes wherein the PIF is one of a frame control field (FCF) or a sounding dialog token field (SDTF) of the announcement frame to indicate to the remote transceiver device that a communication different from a trigger frame may follow, wherein the announcement frame is a null data packet announcement (NDPA) frame.

In Example 55, the subject matter of Example 54 optionally includes wherein the PIF of the NDPA is a first SDTF field located at a beginning of the SDTF and that is two bits long.

In Example 56, the subject matter of any one or more of Examples 53-55 optionally include wherein the encoded field is the FCF.

In Example 57, the subject matter of Example 56 optionally includes wherein the encoded field is a type field of the FCF.

In Example 58, the subject matter of Example 57 optionally includes wherein the encoded field is the type field and a subtype field of the FCF.

In Example 59, the subject matter of any one or more of Examples 57-58 optionally include wherein: the FCF is located at a first octet of the NDPA and is two octets long; the type filed of the FCF is located at a third 25 bit position of the FCF and is two bits long; and the subtype field of the FCF is located at a fifth position of the FCF and is two bits long.

In Example 60, the subject matter of Example 59 optionally includes wherein the PIF is the type field having a value of 00, 01, or 11.

In Example 61, the subject matter of Example 60 optionally includes wherein the encoded field is: the type field having a binary value of 00 and the subtype field having a binary value of 1111; the type field having a binary value of 01 and the subtype field having a binary value of 0000-0011; or the type field having a binary value of 11 and the subtype field having a binary value of 0001-1111.

In Example 62, the subject matter of any one or more of Examples 56-61 optionally include wherein the PIF is a protocol version field (PVF) of the FCF.

In Example 63, the subject matter of Example 62 optionally includes wherein the PVF is a non-zero value.

In Example 64, the subject matter of Example 63 optionally includes wherein the PVF is located at a first bit of the FCF and is two bits long.

In Example 65, the subject matter of any one or more of Examples 53-64 optionally include wherein the non-trigger frame is a broadcast packet frame comprising measurement information for the remote transceiver device.

Example 66 is an apparatus of a wireless communications device utilizing an Institute of Electrical and Electronic Engineers (IEEE) 802.11az protocol, comprising: means for encoding an PIF that is one of a frame control field (FCF) or a sounding dialog token field (SDTF) of a null data packet announcement (NDPA) packet as defined in an IEEE 802.11ax Specification to indicate an NDPA format for an IEEE 802.11az Specification that is a ZNDPA; and means for configuring the wireless device to transmit the ZNDPA packet to one or more stations.

In Example 67, the subject matter of Example 66 optionally includes wherein the PIF is the SDTF.

In Example 68, the subject matter of any one or more of Examples 66-67 optionally include wherein the PIF is the FCF.

In Example 69, the subject matter of Example 68 optionally includes wherein the PIF is a type field of the FCF.

In Example 70, the subject matter of Example 69 optionally includes wherein the PIF is the type field and a subtype field of the FCF.

In Example 71, the subject matter of Example 70 optionally includes wherein the PIF is the type field having a value of 00, 01, or 11.

In Example 72, the subject matter of Example 71 optionally includes wherein the PIF is: the type field having a value of 00 and the subtype field having a value of 1111; the type field having a value of 01 and the subtype field having a value of 0000-0011; or the type field having a value of 11 and the subtype field having a value of 0001-1111.

In Example 73, the subject matter of any one or more of Examples 68-72 optionally include wherein the PIF is a protocol version field (PVF) of the FCF.

In Example 74, the subject matter of Example 73 optionally includes wherein the PVF is a non-zero value.

In Example 75, the subject matter of any one or more of Examples 66-74 optionally include transmitting the ZNDPA packet to one or more stations utilizing transceiver circuitry coupled to the processing circuitry.

In Example 76, the subject matter of Example 75 optionally includes transmitting the ZNDPA packet over one or more antennas coupled to the transceiver circuitry.

Example 77 is a least one machine-readable medium including instructions, which when executed by a machine, cause the machine to perform operations of any of the operations of examples 1-76.

Example 78 is an apparatus comprising means for performing any of the operations of Examples 1-76.

Example 79 is a system to perform operations of any of the Examples 1-76.

Example 80 is a method to perform the operations of any of the Examples 1-76.

The invention claimed is:

1. An apparatus of a station (STA) configured to operate as a initiating STA for performing a sounding protocol with a responding station for communicating via a wireless medium, the apparatus comprising:
processing circuitry; and memory, the processing circuitry configured to:
encode a null data packet (NDP) announcement (NDPA) frame for transmission by the initiating STA to the responding STA, the NDPA frame to include a sounding dialog token (SDT) field;
encode the SDT field to indicate whether the NDPA frame is for a non-trigger-based sounding protocol which is not initiated by a trigger frame or for a trigger-based sounding protocol which is initiated by a trigger frame;
transmit the encoded NDPA frame to the responding STA;
encode an uplink NDP (UL NDP);
transmit the encoded UL NDP a short-interframe spacing (SIFS) after transmission of the NDPA frame;
receive a downlink NDP (DL NDP) from the responding STA after transmission of the UL NDP, the DL NDP received more than an SIFS after transmission of the UL NDP; and
decode the received DL NDP,
wherein the UL NDP and the DL NDP comprise a measurement sounding portion of either the non-trigger-based sounding protocol or the trigger-based sounding protocol,
wherein the UL NDP and the DL NDP comprise measurement information for use in range estimation,
wherein for the non-trigger-based sounding protocol, the UL NDP is transmitted by the initiating STA when the wireless medium is available and the DL NDP is transmitted by the responding STA when the wireless medium is available, and
wherein for the trigger-based sounding protocol, the UL NDP is transmitted by the initiating STA and the DL NDP is transmitted by the responding STA within a transmission opportunity (TXOP) obtained by the initiating STA with the trigger frame, the trigger frame being transmitted by the initiating station before transmission of the encoded NDPA frame.

2. The apparatus of claim 1, wherein the processing circuitry is configured to set a receive address (RA) field of the NDPA frame to an address associated with the responding STA when the SDT field indicates that the NDPA frame is an announcement frame for a sounding protocol.

3. The apparatus of claim 1 wherein the processing circuitry is configured to:
encode the trigger frame to initiate trigger-based sounding by multiple responding stations.

4. The apparatus of claim 1 wherein the processing circuitry comprises a baseband processor and wherein the memory is configured to store the SDT field.

5. The apparatus of claim 4 further comprising:
mixer circuitry to down-convert RF signals to baseband signals; and
synthesizer circuitry, the synthesizer circuitry comprising one of a fractional-N synthesizer or a fractional N/N+1 synthesizer, the synthesizer circuitry configured to generate an output frequency for use by the mixer circuitry, wherein the processing circuitry is configured to decode the baseband signals, the baseband signals.

6. The apparatus of claim 4 further comprising: mixer circuitry to down-convert RF signals to baseband signals; and
synthesizer circuitry, the synthesizer circuitry comprising a delta-sigma synthesizer, the synthesizer circuitry configured to generate an output frequency for use by the mixer circuitry, wherein the processing circuitry is configured to decode the baseband signals.

7. A non-transitory computer-readable storage medium that stores instructions for execution by processing circuitry of a station (STA) to configure the STA for performing a sounding protocol with a responding station for communicating via a wireless medium, wherein the processing circuitry is configured to:
encode a null data packet (NDP) announcement (NDPA) frame for transmission by the initiating STA to the responding STA, the NDPA frame to include a sounding dialog token (SDT) field;
encode the SDT field to indicate whether the NDPA frame is for a non-trigger-based sounding protocol which is not initiated by a trigger frame or for a trigger-based sounding protocol which is initiated by a trigger frame;
transmit the encoded NDPA frame to the responding STA;
encode an uplink NDP (UL NDP);
transmit the encoded UL NDP a short-interframe spacing (SIFS) after transmission of the NDPA frame;
receive a downlink NDP (DL NDP) from the responding STA after transmission of the UL NDP, the DL NDP received more than an SIFS after transmission of the UL NDP; and
decode the received DL NDP,
wherein the UL NDP and the DL NDP comprise a measurement sounding portion of either the non-trigger-based sounding protocol or the trigger-based sounding protocol,
wherein the UL NDP and the DL NDP comprise measurement information for use in range estimation,
wherein for the non-trigger-based sounding protocol, the UL NDP is transmitted by the initiating STA when the wireless medium is available and the DL NDP is transmitted by the responding STA when the wireless medium is available, and
wherein for the trigger-based sounding protocol, the UL NDP is transmitted by the initiating STA and the DL NDP is transmitted by the responding STA within a transmission opportunity (TXOP) obtained by the initiating STA with the trigger frame, the trigger frame being transmitted by the initiating station before transmission of the encoded NDPA frame.

8. The non-transitory computer-readable storage medium of claim 7, wherein the processing circuitry is configured to set a receive address (RA) field of the NDPA frame to an address associated with the responding STA when the SDT field indicates that the NDPA frame is an announcement frame for a sounding protocol.

* * * * *